Angelo Joseph Rossi
INVENTOR.

United States Patent Office 3,291,315
Patented Dec. 13, 1966

3,291,315
SETTLING TANK
Angelo Joseph Rossi, 6 Erith St., Mount Road Township, Port Elizabeth, Cape Province, Republic of South Africa
Filed May 19, 1964, Ser. No. 368,594
Claims priority, application Republic of South Africa, May 22, 1963, 2,240/63
1 Claim. (Cl. 210—519)

This invention relates to settling tanks suitable for settling impurities and for floating off contaminants from liquors.

According to the invention, a settling tank includes a vessel having an upper part having charging means and an overflow and adapted to contain liquid having suspended matter; and a lower part defined by an outer wall converging downwardly, and by an inner wall converging upwardly, the outer and inner walls thereby defining a downwardly converging cavity of annular ring form in plan view, the lower part having a plurality of circumferentially spaced openings at the bottom of the cavity; an upwardly extending discharge pipe having its discharge opening at a level below the overflow; and a plurality of circumferentially spaced outlet conduits connecting the bottom of the downwardly converging cavity to the discharge pipe; whereby suspended matter in liquid in the vessel will settle out into the lower part, and whereby such suspended matter will be discharged via the discharge pipe under the static head in the vessel.

The overflow of the upper part may include an overflow duct extending at least partly around the periphery of the vessel and having an outlet opening, and an overflow lip forming at least part of the inner wall of the duct.

The charging means may include a centrally disposed downwardly extending charging well having a bottom opening, the well extending upwardly beyond the height of the overflow lip and having an inlet opening arranged to discharge about the axis of the well. The bottom opening of the charging well may be at a level higher than the top of the upwardly converging inner wall.

The outlet conduits may be directed inwardly towards the vessel axis, and there may be provided a header disposed centrally, to which the outlet conduits are connected at their inner ends, the discharge pipe being connected at its lower end to the header, and extending transversely at its upper end through the wall of the vessel.

A plurality of circumferentially spaced upwardly directed baffles may be provided in the lower region of the downwardly converging cavity.

There may be provided a flushing inlet pipe and an opposed drain pipe leading respectively into and out of the bottom of the downwardly converging cavity, and a valve for each pipe; whereby the bottom of the cavity may be flushed from time to time.

The included angle defined by the inner and outer walls of the downwardly converging cavity conveniently does not exceed 45°. The inner and outer walls are conveniently round.

The invention will now be described with reference to the accompanying drawings.

Figure 1:
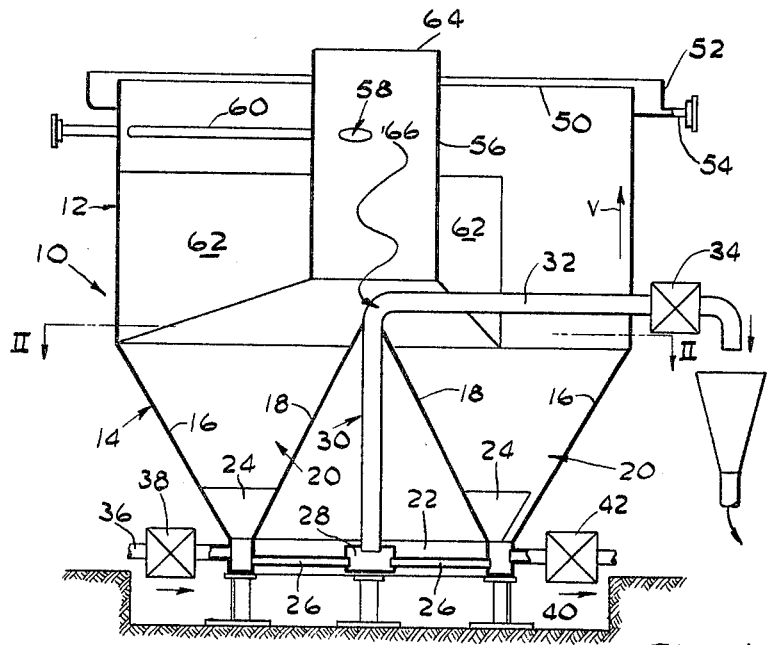
Figure 2:
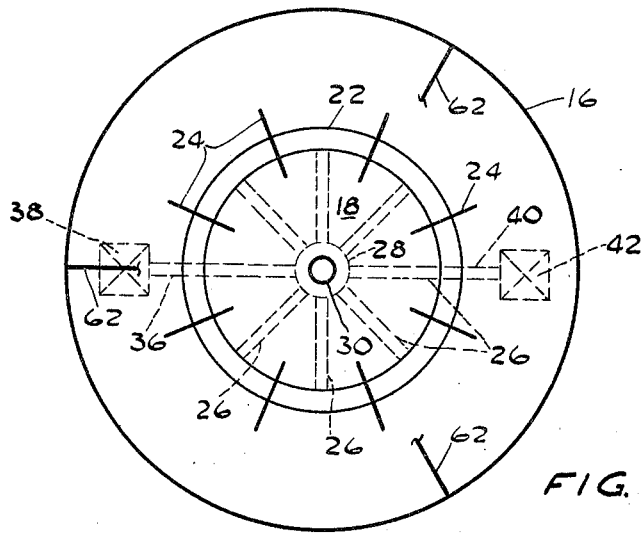

In the drawings:
FIGURE 1 shows diagrammatically a sectional side elevation of a vessel in accordance with the invention; and
FIGURE 2 shows a sectional plan at II—II in FIGURE 1.

Reference numeral 10 refers generally to a vessel having a cylindrical upper portion 12 and a lower portion generally designated by reference 14. The lower portion comprises downwardly converging outer wall 16 and upwardly converging inner wall 18, the walls between them defining a downwardly converging cavity 20 of annular cross-section.

The bottom of the cavity comprises an annular channel 22. Above the channel there are provided a plurality of arcuately spaced upright baffles 24. The channel has a plurality of inwardly directed openings connected via outlet conduits 26 to a header 28. A centrally disposed discharge pipe 30 connected at its lower end to the header 28, is provided, the pipe having a transverse limb 32 leading transversely out of the vessel. The limb has an outlet valve 34 outside the vessel.

The bottom of the cavity has a flushing inlet pipe 36 having stop valve 38, and a flushing drain pipe 40 having stop valve 42.

The upper portion 12 of the vessel has an overflow lip 50, an overflow duct 52 having outlet 54, and a centrally disposed, downwardly extending charging well 56 having tangential inlet opening 58 connected to inlet pipe 60. The charging well 56 is supported by radial supports 62. The upper end 64 of the well 58 extends above the level of the overflow lip 50. If desired, the inlet opening 58 may be at a level above or below the overflow lip 50.

In use, a liquor carrying matter in suspension requiring settling, is charged into the central charging well via opening 58. Flow spirals down the well in the direction of arrow 66 and solid matter, flock, and sludge settle down into the bottom of the cavity 20. The baffle plates 24 restrict circular flow in the bottom of the cavity 20.

The rate of flow into the vessel is conveniently such that the rising flow V conveniently does not exceed three feet per hour. Clear liquor flows over lip 50 into the overflow duct 52. The matter which has settled in the bottom of the cavity is discharged periodically under the static head in the vessel, by opening valve 34. The bottom of the cavity, header 28 and pipes 26 may be flushed occasionally via pipes 36 and 40. If desired, the operation of valve 34 may be automatically controlled to open for short periods at predetermined intervals.

I claim:
A settling tank which includes: a vessel having an upper part having charging means and an overflow and adapted to contain liquid having suspended matter; and a lower part defined by an outer wall converging downwardly and by an inner wall converging upwardly, the outer and inner walls thereby defining a downwardly converging cavity of annular ring form in plan view the lower part having a plurality of circumferentially spaced openings at the bottom of the cavity; an upwardly extending discharge pipe having its discharge opening at a level below the overflow; and a plurality of circumferentially spaced outlet conduits connecting the bottom of the downwardly converging cavity to the discharge pipe; the charging means including a centrally disposed downwardly extending charging well having a bottom opening at a level higher than the top of the upwardly converging inner wall, the wall extending upwardly beyond the height of the overflow and having an inlet opening arranged to discharge about the axis of the well; whereby suspended matter in liquid in the vessel will settle out into the lower part, and whereby such suspended matter will be discharged via the discharge pipe under the static head in the vessel.

References Cited by the Examiner

UNITED STATES PATENTS

| | | |
|---|---|---|
| 1,219,796 | 3/1917 | Atkins et al. |
| 2,127,314 | 8/1938 | Spaulding _____ 210—534 X |
| 2,450,070 | 9/1948 | Wright _____ 210—532 X |
| 2,564,963 | 8/1951 | Drigenko et al. ____ 210—512 X |
| 2,796,175 | 6/1957 | Cover _____ 210—532 X |

FOREIGN PATENTS

| | | |
|---|---|---|
| 181,575 | 4/1955 | Austria. |
| 47,217 | 6/1889 | Germany. |

SAMIH N. ZAHARNA, *Primary Examiner.*

REUBEN FRIEDMAN, *Examiner.*

D. M. RIESS, *Assistant Examiner.*